United States Patent [19]
Kuo et al.

[11] Patent Number: 5,923,537
[45] Date of Patent: Jul. 13, 1999

[54] POWER-ON PROTECTIVE STRUCTURE FOR EXPANSION CARDS OF PORTABLE COMPUTERS OR THE LIKE

[75] Inventors: Chung-Hua Kuo; Shih-Hsuan Wang, both of Taipei, Taiwan

[73] Assignee: Inventec Corporation, Taipei, Taiwan

[21] Appl. No.: 08/950,906

[22] Filed: Oct. 15, 1997

[30] Foreign Application Priority Data

Apr. 8, 1997 [TW] Taiwan ................................. 86205373

[51] Int. Cl.$^6$ .............................. H05K 5/00; H05K 7/00; H05K 1/14
[52] U.S. Cl. ........................... 361/755; 361/728; 361/736
[58] Field of Search ................................ 361/728, 736, 361/747, 796, 683, 685, 686, 755; 395/750.01; 364/708

[56] References Cited

U.S. PATENT DOCUMENTS

| | | | |
|---|---|---|---|
| 4,894,792 | 1/1990 | Mitchell et al. | 364/708 |
| 5,422,784 | 6/1995 | Wakahara et al. | 361/680 |

*Primary Examiner*—Ayaz R. Sheikh
*Assistant Examiner*—Tim Vo
*Attorney, Agent, or Firm*—Smith, Gambrell & Russell, LLP; Beveridge, DeGrandi, Weilacher & Young Intellectual Property Group

[57] ABSTRACT

A power-on protective structure for expansion cards installed in a portable computer or the like is provided. The power-on protective structure allows the replacement of the expansion card currently installed in the portable computer to be carried out only when the power supply to the expansion card is disconnected so that the data stored in the expansion card will not be damaged or lost due to inadvertent detachment of the expansion card from the portable computer while the power is still on. The power-on protective structure includes a casing; a battery compartment formed in the casing for accommodating at least one battery therein; a receptacle formed in the casing for accommodating an expansion card therein; a first cover for covering the battery compartment; and a second cover for covering the receptacle. The second cover is formed with a stopper portion which is inserted and positioned in the battery compartment when the second cover is positioned on the receptacle in such a manner that the stopper portion is impeded by the battery installed in the battery compartment, preventing the second cover from being detached from position unless the battery in the battery compartment is first removed. With the foregoing power-on protective structure, the power is always off when replacing the expansion card in the portable computer.

4 Claims, 5 Drawing Sheets

POWER-ON PROTECTIVE STRUCTURE FOR EXPANSION CARDS OF PORTABLE COMPUTERS OR THE LIKE

BACKGROUND OF THE INVENTION

1. Field of the Invention

This invention relates to expansion means for portable computers such as laptop and palmtop computers as well as for various other intelligent electronic devices, and more particularly, to a power-on protective structure for expansion cards installed in a portable computer or the like, which allows the replacement of the expansion cards installed in a portable computer or the like to be carried out only when the power supplied to the expansion cards is disconnected. This feature allows the data stored in the expansion cards not to be damaged or lost due to inadvertent detachment of the expansion cards from the portable computer while the power is still on.

2. Description of Related Art

Portable computers are now made increasingly smaller in size with more integrated functionality. Since a portable computer is smaller in size, the inside space is usually not large enough to accommodate all the required function modules therein. As a solution to this problem, a portable computer is typically provided with various expansion means that allow the portable computer to be installed with additional function modules provided on expansion cards, such as memory cards, hard drive cards, and so on. In general, the casing of the portable computer is formed with a receptacle in which expansion slots are provided so as to allow for easy replacement of the expansion cards. In replacing expansion cards, it is required that the replacement be made while the power supply to the expansion cards is disconnected; otherwise, it may cause damage to or data to be lost from the expansion cards.

One conventional solution to the foregoing problem is to provide a power detection device in the receptacle of the expansion cards that can detect whether or not the power system of the portable computer is turned off when the user wishes to remove the installed expansion cards in the portable computer. If the power is still on, the power detection device will send out a trigger signal to the power supply to turn off the power, allowing the user to replace the expansion cards under a power-off condition. This allows the replacement of the expansion cards to be carried out only when the power is turned off.

The foregoing power detection device, however, has several drawbacks. First, in the event that the power detection device fails for any reason, it will cause the user to replace the expansion cards under a power-on condition that would, as mentioned before, cause damage to or data to be lost from the expansion cards. There exists, therefore, a need for a new means that can ensure that the power is definitely off while replacing the expansion cards. Second, in the event that the portable computer accidentally falls to the ground, the power detection device can be damaged and thus become no longer functional. If any of the expansion cards is knocked out of the installed position from the receptacle under power-on conditions, it will cause damage to or data to be lost from the expansion cards. Third, the power detection device is high in manufacturing cost making it less competitive on the market.

SUMMARY OF THE INVENTION

It is therefore an objective of the present invention to provide a power-on protective structure for expansion cards which allows the replacement of the expansion cards installed in a portable computer to be carried out only when the power supply to the expansion cards is disconnected. In this way the data stored in the expansion cards will not be lost due to inadvertent detachment of the expansion cards from the portable computer while the power is still on.

It is another objective of the present invention to provide a power-on protective structure for expansion cards which can prevent the expansion cards installed in a portable computer from being detached while the power is still on due to, for instance, the portable computer falling to the ground.

It is still another objective of the present invention to provide a power-on protective structure for expansion cards which is simple in structure and thus low in manufacturing cost.

In accordance with the foregoing and other objectives of the present invention, a power-on protective structure for expansion cards is provided. The power-on protective structure for expansion cards of the invention includes the following constituent parts:

(a) a casing;

(b) a battery compartment formed in the casing for accommodating at least one battery therein;

(c) a receptacle formed in the casing for accommodating an expansion card therein;

(d) a first cover for covering on the battery compartment; and (e) a second cover for covering on the receptacle, the second cover having a stopper tongue which is inserted and positioned in the battery compartment when the second cover is positioned on the receptacle in such a manner that the stopper tongue is being stopped by the battery installed in the battery compartment such that the second cover cannot be detached from position unless the battery in the battery compartment is removed.

The stopper tongue has a free end formed with a stopper portion which is extended out from and substantially perpendicular to the extended portion of the stopper tongue. When the second cover is positioned on the receptacle, the stopper portion is placed under the battery in the battery compartment and thus stopped by the same, such that the second cover cannot be uncovered unless the battery in the battery compartment is removed (i.e., unless the power supply to the expansion card is disconnected).

The first cover is preferably detachable from the battery compartment. The detachable cover can be a conventional engagement/disengagement structure such as a slot/tongue structure that allows the first cover to be put in position on the battery compartment.

The second cover can be formed with a similar engagement/disengagement structure, such as a slot/tongue structure, that allows the second cover to be detachably positioned on the receptacle.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
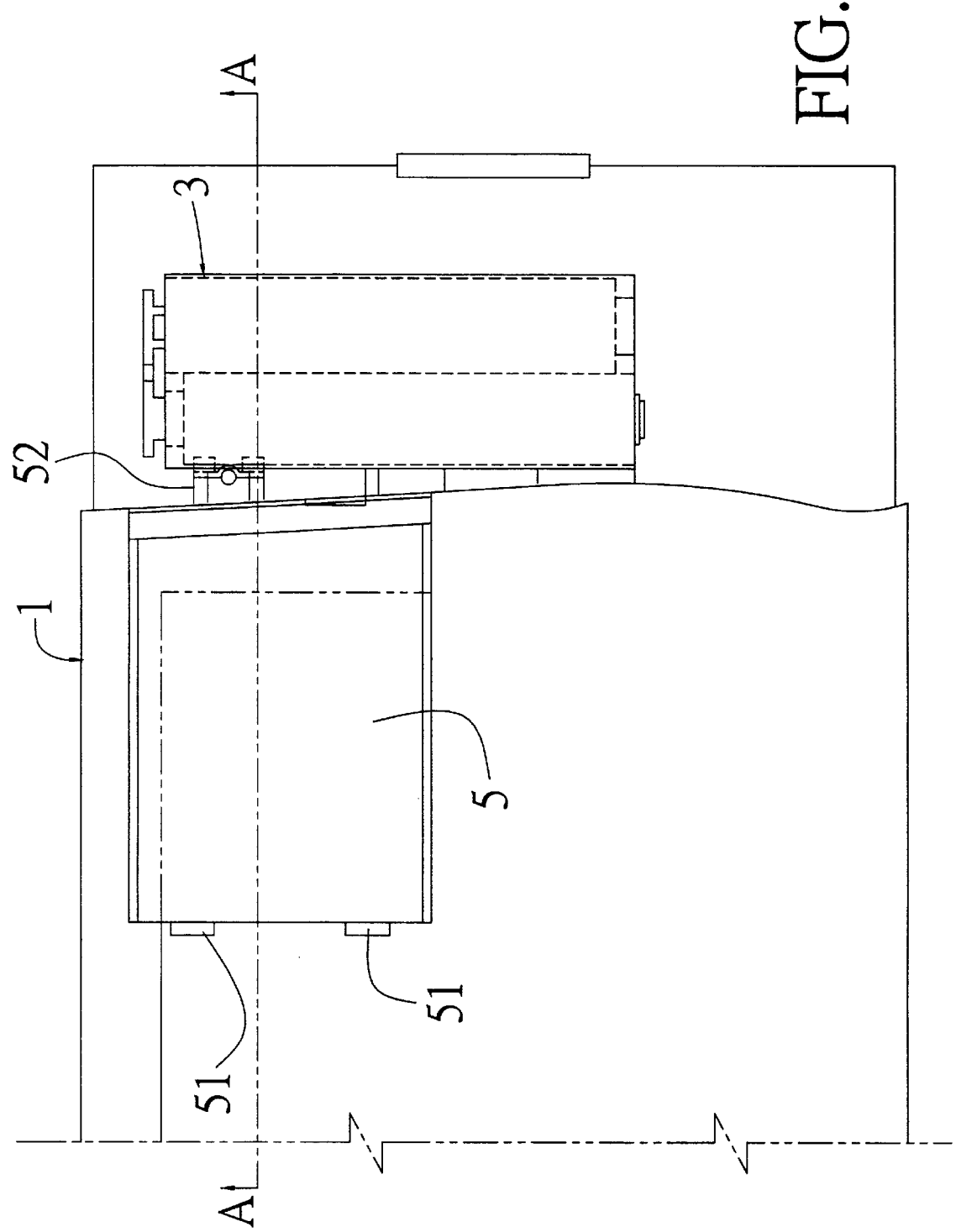
FIG. 1 is a schematic top view of the power-on protective structure for expansion cards according to the invention.
Figure 2:
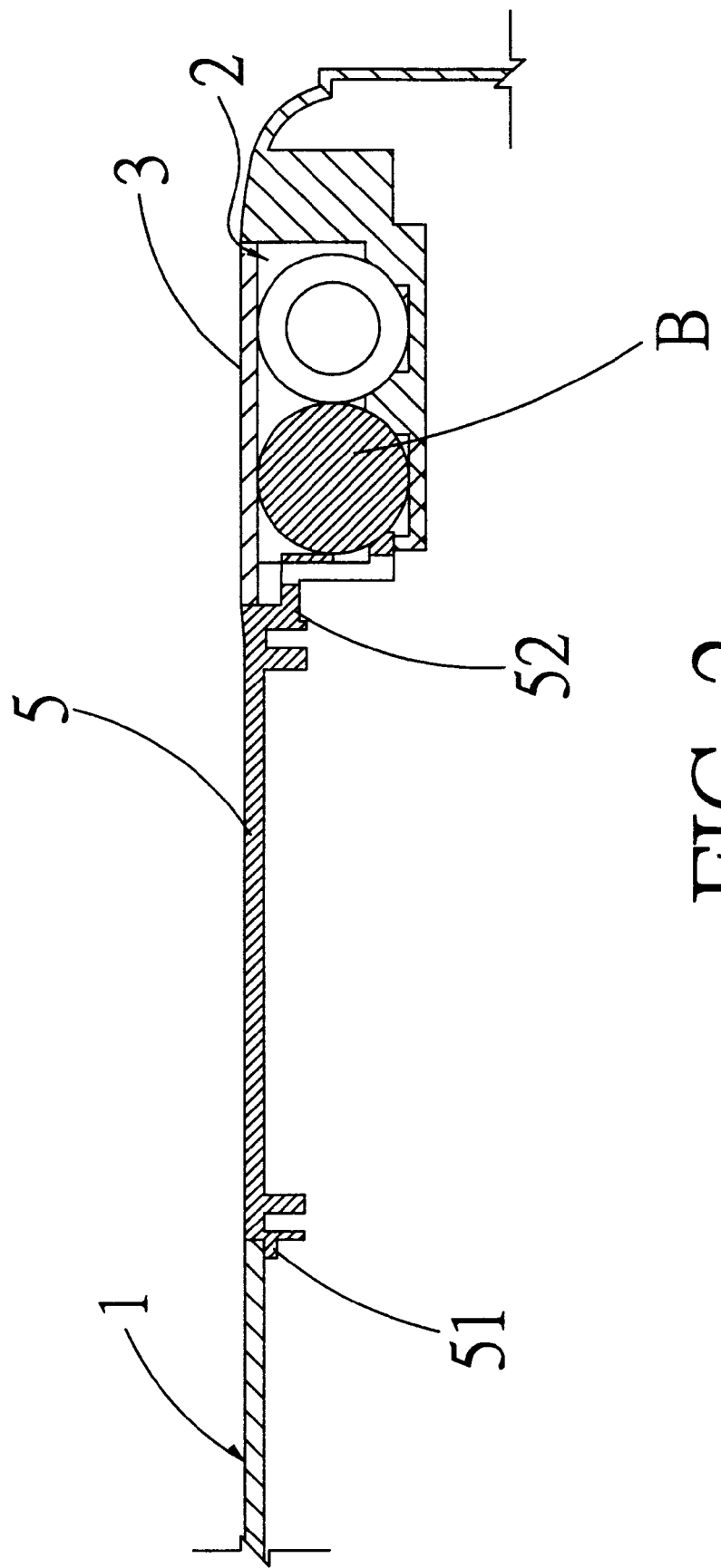
FIG. 2 is a schematic side view of the power-on protective structure for expansion cards of FIG. 1 cutting through the line A—A.

FIG. 1 is a schematic top view of the power-on protective structure for expansion cards according to the invention; and FIG. 2 is a schematic side view of the same. As shown, the power-on protective structure for expansion cards of the invention includes a casing 1, a battery compartment 2, a first cover 3 for covering the battery compartment 2, a receptacle 4 for accommodating an expansion card (not shown) therein, and a second cover 5 for covering the receptacle 4.

Figure 4:
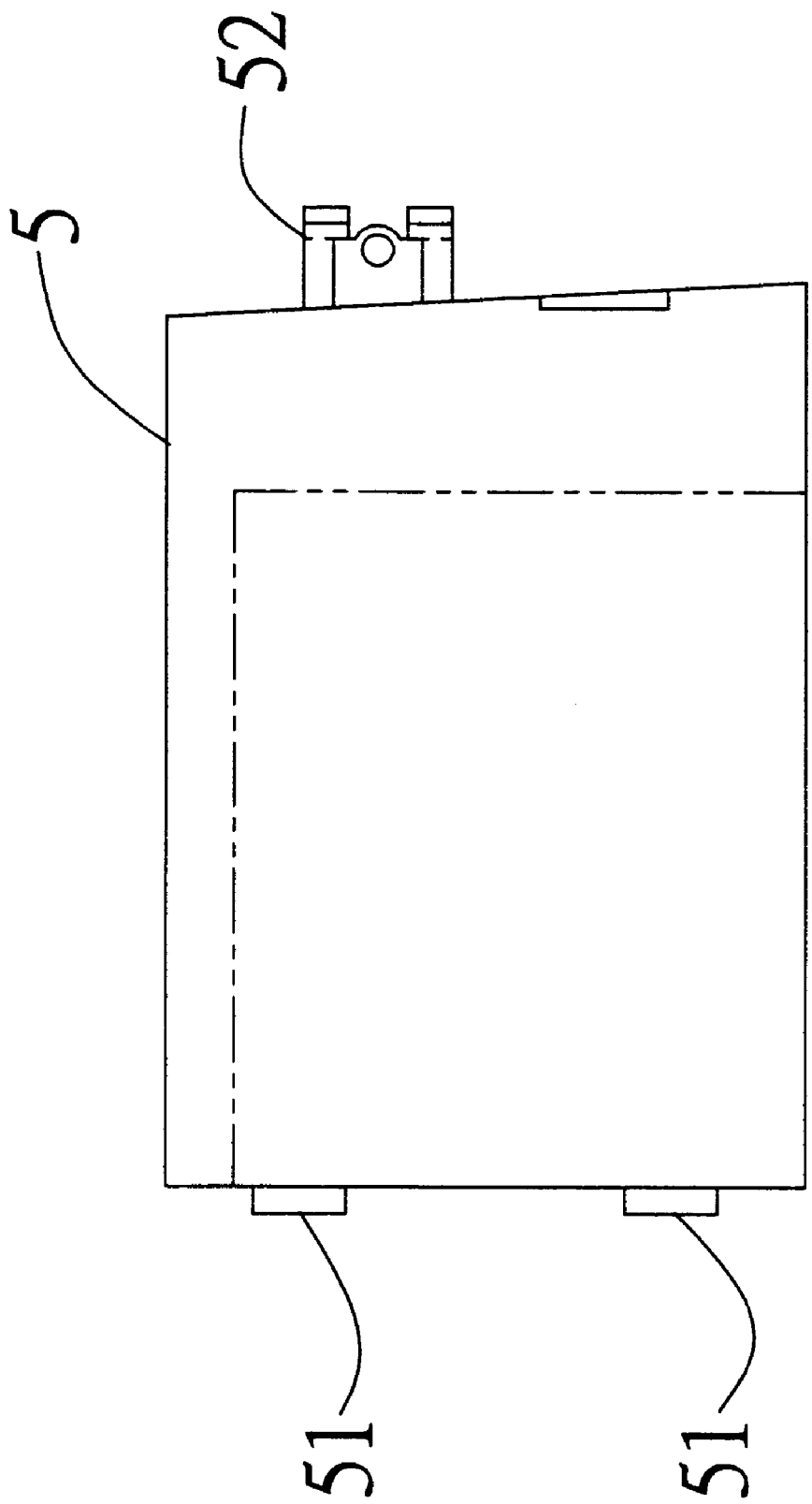
FIG. 4 is a schematic top view of the cover utilized in the power-on protective structure for expansion cards of the invention.
Figure 5:
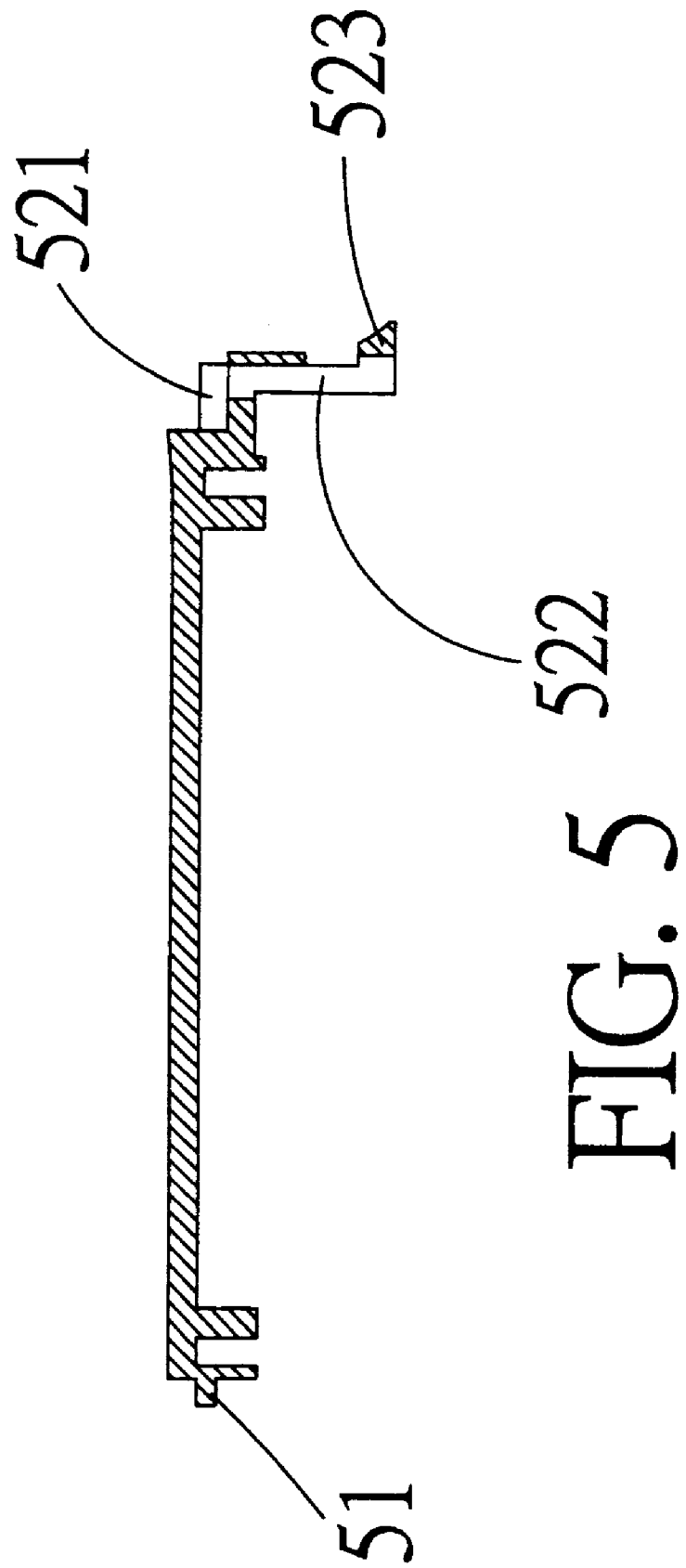
FIG. 5 is a schematic side view of the cover shown in FIG. 4.

Referring also to FIGS. 4 and 5, the second cover 5 is formed with a pair of mounting tongues 51 on one side thereof, which are abutted on the inner wall of the casing 1, and a stopper tongue 52 on the other side. The second cover 5 is used to cover the receptacle 4. The expansion card (not shown) installed in the receptacle 4 can be taken out only when the second cover 5 is lifted or detached. The stopper tongue 52 includes a base 521, an extended portion 522 oriented perpendicular to the base 521, and a stopper portion 523 extending out substantially from the free end of and perpendicular to the extended portion 522. When the second cover 5 is covered on or attached to the receptacle 4, the mounting tongues 51 thereof come into abutment on the inner wall of the casing 1, and the stopper tongue 52 is inserted into the battery compartment 2. A battery B is installed in the battery compartment 2 in such a manner that the stopper portion 523 is impeded by the battery B, resulting in the second cover 5 remaining attached to the covering position unless the battery B is removed from the battery compartment 2.

Figure 3:
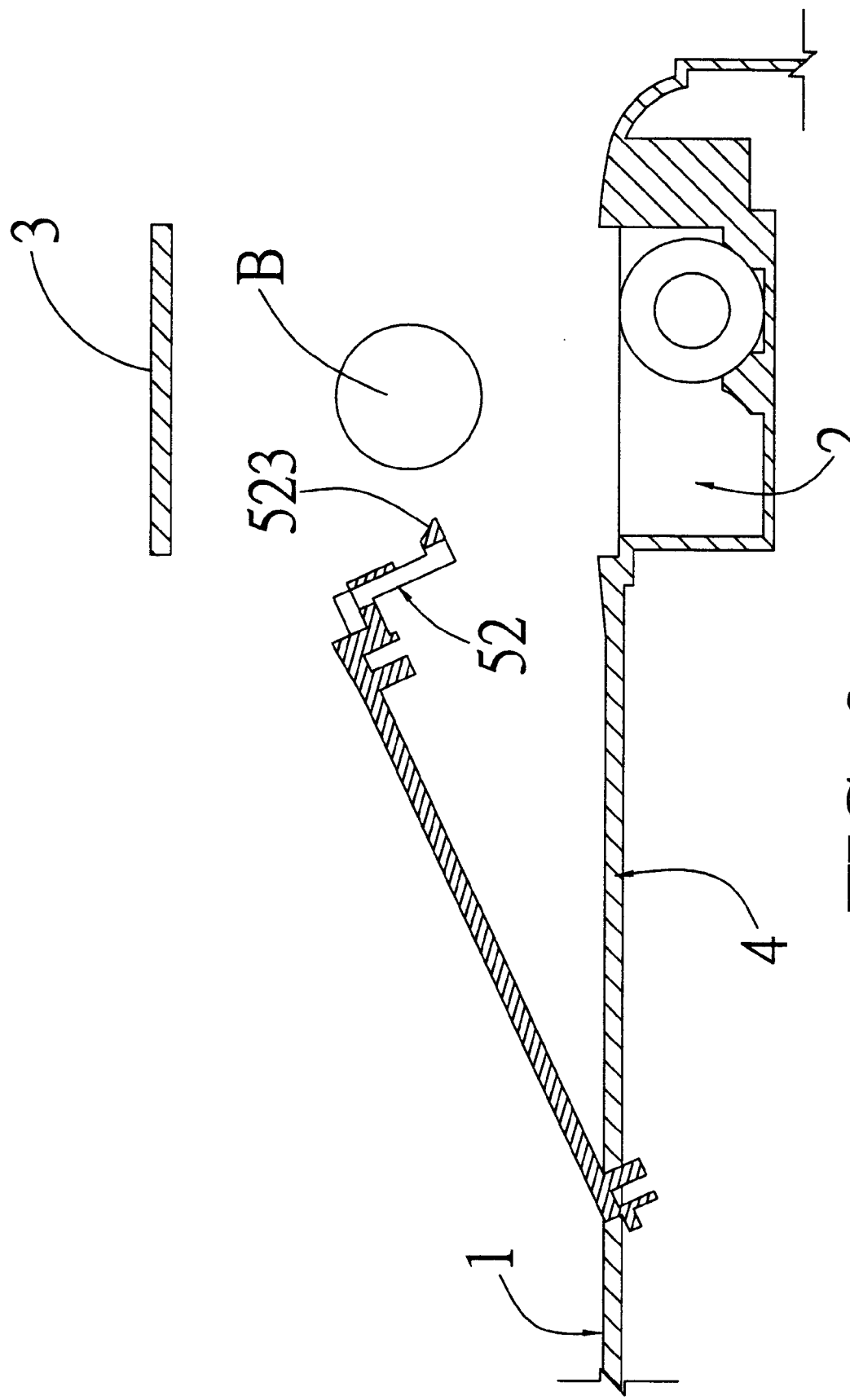
FIG. 3 is a schematic side view showing the power-on protective structure for expansion cards of FIG. 2 when a cover is lifted for replacement of a battery.

Referring to FIG. 3, when replacing the expansion card, the user needs to first lift the first cover 3 on the battery compartment 2 and then remove the battery B from the battery compartment 2. This frees the stopper portion 523 of the second cover 5 from being stopped by the battery B and thereby allows the second cover 5 to be lifted. The expansion card covered by the second cover 5 can thus be removed and replaced with a new one.

The first cover 3 is preferably detachable from the battery compartment 2. The structure of the detachable cover is conventional and not within the spirit of the invention, so description thereof will not be detailed.

In conclusion, by employing the power-on protective structure for expansion cards of the invention, the expansion card currently installed in the portable computer can be replaced only after the battery in the battery compartment 2 is first removed. In other words, the expansion card can be replaced only after the power to the computer is entirely disconnected. This can protect the data in the expansion card from being damaged due to being removed from the portable computer while the power is still on. In the event of the computer falling to he ground causing the expansion card to be knocked out of the receptacle 4, the first cover 3 covering the battery compartment 2 and the battery B in the battery compartment 2 would be knocked out of position first, causing the power supply to the expansion card to be interrupted. Thus at the time the expansion card is knocked out of the receptacle 4, no electricity is being supplied thereto. If the first cover 3 remains in position, the battery B will remain in the battery compartment 2. In this case the second cover 5 covering receptacle 4 will still remain in position to protect the expansion card in receptacle 4.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A power-on protective structure for an expansion card installed in an electronic device, comprising:

a casing;

a battery compartment formed in said casing for accommodating at least one battery therein, a receptacle formed in said casing for accommodating the expansion card therein;

a first cover for covering said battery compartment; and a second cover for covering said receptacle, said second cover having a stopper tongue which is inserted and positioned in said battery compartment when said second cover is positioned on said receptacle in such a manner that said stopper tongue is being stopped by the battery installed in said battery compartment such that said second cover is not detachable unless the battery in said battery compartment is removed.

2. The power-on protective structure of claim 1, wherein a stopper portion is formed at the free end of said stopper tongue, which is stopped by the battery in said battery compartment when said second cover is attached on said receptacle.

3. The power-on protective structure of claim 1, wherein said stopper tongue is formed with a base portion, an extended portion oriented perpendicular to said base portion, and a stopper portion formed on the free end of said extended portion.

4. The power-on protective structure of claim 3, wherein said stopper portion is extended out from and substantially perpendicular to said extended portion of said stopper tongue.

* * * * *